(12) United States Patent
Nishikawa

(10) Patent No.: US 11,261,996 B2
(45) Date of Patent: Mar. 1, 2022

(54) FLUID CONTROL VALVE DIAGNOSTIC DEVICE, FLUID CONTROL DEVICE, AND FLUID CONTROL VALVE DIAGNOSTIC PROGRAM

(71) Applicant: HORIBA STEC, Co., Ltd., Kyoto (JP)

(72) Inventor: Masami Nishikawa, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 16/343,476

(22) PCT Filed: Sep. 27, 2017

(86) PCT No.: PCT/JP2017/035040
§ 371 (c)(1),
(2) Date: Apr. 19, 2019

(87) PCT Pub. No.: WO2018/079173
PCT Pub. Date: May 3, 2018

(65) Prior Publication Data
US 2019/0242493 A1      Aug. 8, 2019

(30) Foreign Application Priority Data

Oct. 28, 2016   (JP) .............................. JP2016-211660

(51) Int. Cl.
*F16K 37/00* (2006.01)
*G05D 7/06* (2006.01)
*F16K 31/00* (2006.01)

(52) U.S. Cl.
CPC ........ *F16K 37/0041* (2013.01); *F16K 31/007* (2013.01); *F16K 37/00* (2013.01);
(Continued)

(58) Field of Classification Search
CPC .... F16K 37/0041; F16K 31/007; F16K 37/00; F16K 37/005; F16K 37/0083; F16K 37/0091; G05D 7/06
(Continued)

(56) References Cited

U.S. PATENT DOCUMENTS

2005/0137751 A1    6/2005  Cox et al.
2008/0264498 A1*  10/2008  Thompson .......... F16K 37/0083
                                                         137/554
(Continued)

FOREIGN PATENT DOCUMENTS

CN       101551676 A    10/2009
CN       102687087 A     9/2012
(Continued)

OTHER PUBLICATIONS

ISA Japan Patent Office, International Search Report Issued in International Application No. PCT/JP2017/035040, dated Nov. 14, 2017, WIPO, 4 pages.
(Continued)

*Primary Examiner* — Angelisa L. Hicks
(74) *Attorney, Agent, or Firm* — Alleman Hall Creasman & Tuttle LLP

(57) ABSTRACT

In order to make it possible to obtain information on the movement of a fluid control valve when a fluid control device operates normal, a diagnostic device for a fluid control valve that displaces a valve body to control fluid is adapted to include: a valve body related value reception part that receives a valve body related value inputted/outputted in association with the displacement of the valve body; a displacement sensing part that senses the displacement of the valve body on the basis of the valve body related value; and a displacement count storage part that stores a displacement count sensed by the displacement sensing part.

6 Claims, 4 Drawing Sheets

(52) U.S. Cl.
CPC ........ *F16K 37/005* (2013.01); *F16K 37/0083* (2013.01); *F16K 37/0091* (2013.01); *G05D 7/06* (2013.01)

(58) Field of Classification Search
USPC ........................................................ 137/554
See application file for complete search history.

(56) References Cited

U.S. PATENT DOCUMENTS

| | | | | |
|---|---|---|---|---|
| 2009/0306830 | A1* | 12/2009 | Cummings | G05B 23/0283 700/282 |
| 2013/0153041 | A1* | 6/2013 | Kucera | F23N 1/002 137/14 |
| 2015/0107675 | A1* | 4/2015 | Kucera | F16K 37/0041 137/1 |
| 2017/0102095 | A1* | 4/2017 | Kunita | F16K 37/0091 |

FOREIGN PATENT DOCUMENTS

| | | |
|---|---|---|
| CN | 204784901 U | 11/2015 |
| JP | 61228181 A | 10/1986 |
| JP | 64046083 A | 2/1989 |
| JP | 03180724 A | 8/1991 |
| JP | 08219305 A | 8/1996 |
| JP | 10332040 A | 12/1998 |
| JP | 2002310333 A | 10/2002 |
| JP | 2009137590 A | 6/2009 |
| JP | 2015121898 A | 7/2015 |
| TW | 200527172 A | 8/2005 |
| TW | 200947176 A | 11/2009 |
| WO | 2011047361 A1 | 4/2011 |

OTHER PUBLICATIONS

Taiwan Intellectual Property Office, Office Action and Search Report Issued in Application No. 106134105, dated Mar. 10, 2021, 12 pages.
China National Intellectual Property Administration, Office Action Issued in Application No. 201780065304 8, dated Jul. 29, 2021, 17 pages.
Japan Patent Office, Office Action Issued in Application No. 2018-547217, dated Oct. 7, 2021, 6 pages.

* cited by examiner

FLUID CONTROL VALVE DIAGNOSTIC DEVICE, FLUID CONTROL DEVICE, AND FLUID CONTROL VALVE DIAGNOSTIC PROGRAM

TECHNICAL FIELD

The present invention relates to a fluid control valve diagnostic device, a fluid control device, and a fluid control valve diagnostic program.

BACKGROUND ART

As a fluid control valve, as disclosed in Patent Literature 1, there is one that displaces a valve body with respect to a valve seat to thereby, for example, control the flow rate of fluid. Fluid control devices including such a fluid control valve are managed with, for example, a lifetime determined, and one exceeding the lifetime is maintained or replaced.

Meanwhile, even when maintenance is regularly performed or a lifetime is not exceeded, a fluid control device may have a problem. The inventor of the present application has focused on the fact that the causes of this include deterioration associated with the movement of a fluid control valve, and considered configuring the fluid control device to be replaceable before this causes a problem in the fluid control valve.

However, in the past, information on the movement of a fluid control valve has not been obtainable from a fluid control device, and the effect of deterioration associated with the movement of the fluid control valve has not been evaluable.

CITATION LIST

Patent Literature

Patent Literature 1
Japanese Unexamined Patent Publication JP-A2015-121898

SUMMARY OF INVENTION

Technical Problem

Therefore, the present invention has been made in order to solve the above problem, and the main object thereof is to make it possible to obtain information on the movement of a fluid control valve from a fluid control device.

Solution to Problem

That is, a fluid control valve diagnostic device of the present invention is a diagnostic device being for a fluid control valve that displaces a valve body to control fluid, and includes: a valve body related value reception part that receives a valve body related value inputted/outputted in association with displacement of the valve body; a displacement sensing part that senses the displacement of the valve body on the basis of the valve body related value; and a displacement count storage part that stores a displacement count obtained by the displacement sensing part.

Since such a fluid control valve diagnostic device senses the displacement count of the valve body, as well as stores the displacement count, information on the movement of the fluid control valve can be obtained from the fluid control device. This makes it possible to evaluate the effect of deterioration associated with the movement of the fluid control valve, and therefore before a problem occurs in the fluid control valve due to the effect of the deterioration associated with the movement of the fluid control valve, a user can be prompted to perform maintenance.

Specific embodiments of the displacement sensing part include: a configuration in which when a variation in the valve body related value exceeds a predetermined threshold value, the displacement sensing part senses this as the displacement of the valve body; and a configuration in which when the fluid control valve moves to a fully opened position or a fully closed position, the displacement sensing part senses this as the displacement of the valve body.

Such configurations enable, when the movement of the valve body is very small, such as when the valve body is moved due to the effect of noise, the movement to be prevented from being sensed as displacement, and therefore the effect of the deterioration associated with the movement of the fluid control valve can be properly evaluated.

In order to report to a user that the fluid control valve has to be replaced or maintained due to the deterioration associated with the movement of the fluid control valve, it is preferable to further include a reporting part that compares the displacement count stored by the displacement count storage part with a predetermined count, and when the displacement count exceeds the predetermined count, outputs a reporting signal indicating this.

As the valve body related value, the calculated flow rate of the fluid, the set flow rate of the fluid, a drive voltage for displacing the valve body, a current or a voltage outputted corresponding to the position of the valve body, or the like can be cited.

Also, a fluid control device according to the present invention is one including the above-described fluid control valve and fluid control valve diagnostic device.

Further, a fluid control device diagnostic program according to the present invention is a program that is used to diagnose a fluid control valve that displaces a valve body to control fluid, and instructs a computer to fulfil functions as: a valve body related value reception part that receives a valve body related value inputted/outputted in association with the displacement of the valve body; a displacement sensing part that senses the displacement of the valve body on the basis of the valve body related value; and a displacement count storage part that stores a displacement count obtained by the displacement sensing part.

Such a fluid control device and fluid control device diagnostic program can produce the same working effects as those of the above-described fluid control valve diagnostic device.

Advantageous Effects of Invention

According to the present invention configured as described above, information on the movement of the fluid control valve of the fluid control device can be obtained, and by evaluating the effect of the deterioration associated with the movement of the fluid control valve, a user can be prompted to perform maintenance before a problem occurs in the fluid control valve.

LIST OF REFERENCE CHARACTERS

Figure 1:
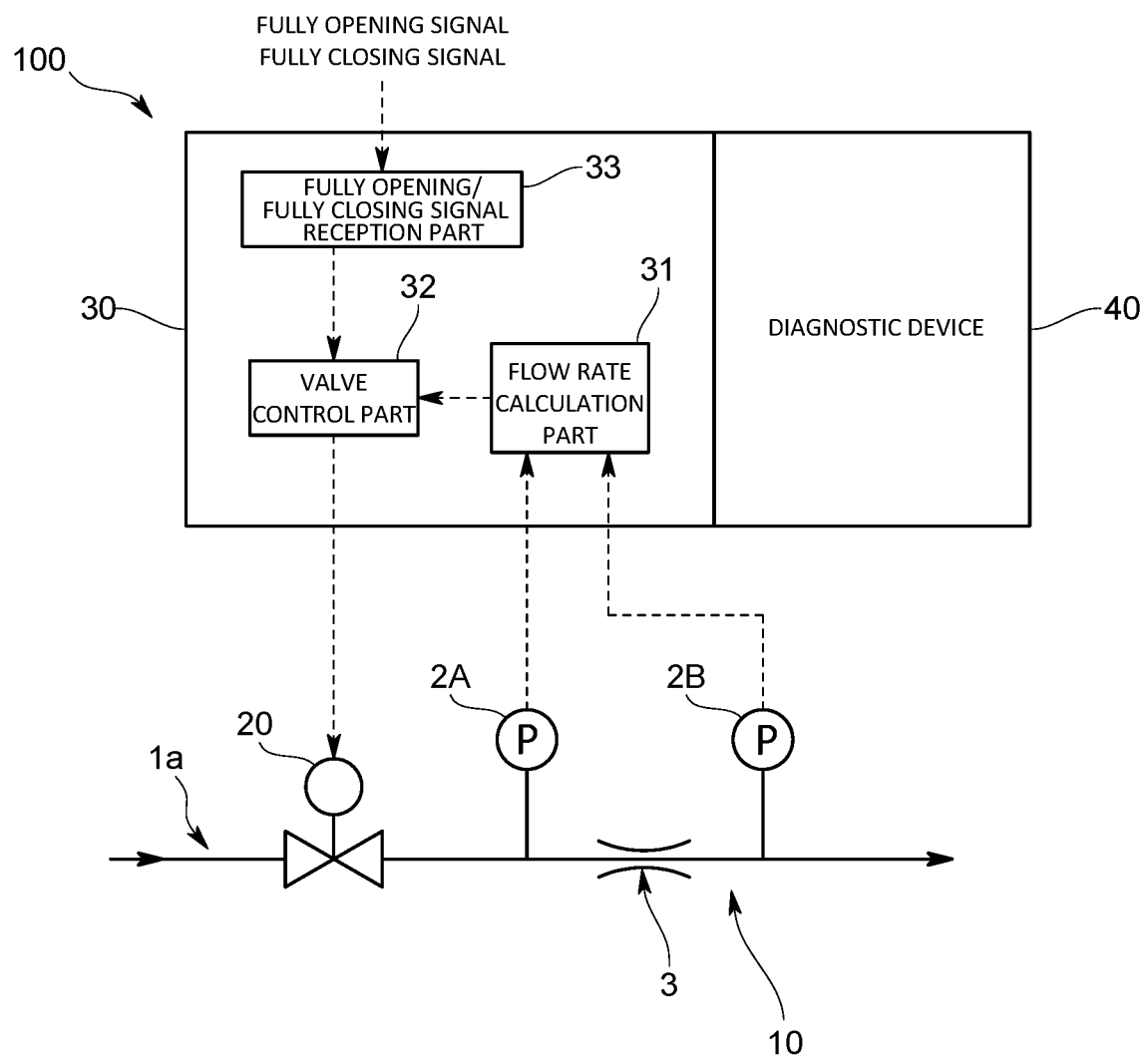
FIG. 1 is a diagram schematically illustrating a circuit configuration of a fluid control device of the present embodiment.

200 Diagnostic device
100 Fluid control device
20 Fluid control valve
22 Valve body
40 Diagnostic device
41 Valve body related value reception part
42 Displacement sensing part
43 Displacement count storage part
44 Reporting part

DESCRIPTION OF EMBODIMENTS

In the following, one embodiment of a fluid control valve diagnostic device according to the preset invention will be described with reference to the drawings.

A fluid control valve diagnostic device 40 of the present embodiment is one for diagnosing a fluid control valve 20 constituting a fluid control device 100. First, the fluid control device 100 will be briefly described.

Figure 2:
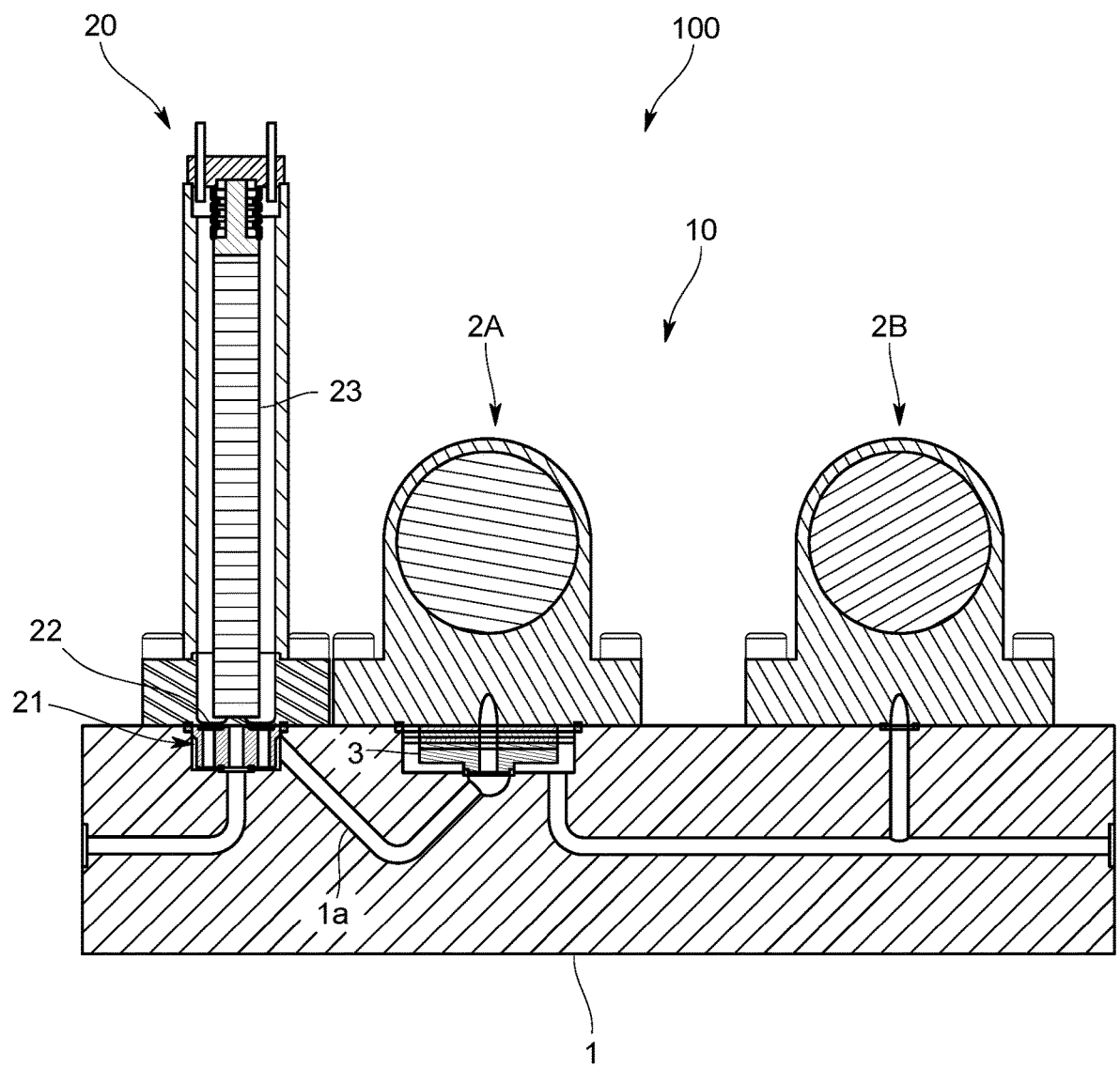
FIG. 2 is a diagram schematically illustrating the overall configuration of the fluid control device of the same embodiment.

The fluid control device 100 according to the present embodiment is one mounted on, for example, a gas panel to constitute a part of a material supply line of a semiconductor manufacturing apparatus, and as illustrated in a fluid circuit diagram of FIG. 1 and in the cross-sectional view of an overall configuration of FIG. 2, a mass flow controller configured to include: a body unit 1 having an internal flow path 1a through which fluid flows; a flow rate measuring mechanism 10 provided in the internal flow path 1a to measure the mass flow rate of the fluid flowing through the internal flow path 1a; the fluid control valve 20 provided on an upstream side of the flow rate measuring mechanism 10; and a control circuit 30 (not illustrated in FIG. 2) that controls the fluid control valve 20 so that the measured flow rate by the flow rate measuring mechanism 10 becomes equal to a predetermined target flow rate.

The flow rate measuring mechanism 10 is one that is of a so-called differential pressure type, and in terms of a fluid circuit, as illustrated in FIG. 1, includes: a resistive flow path 3 provided in the internal flow path 1a; and a pair of pressure sensors 2A, 2B adapted to measure fluid pressures in the internal flow path 1a on an upstream side and a downstream side of the resistive flow path 3. In addition, the flow rate measuring mechanism 10 is configured to be able to measure the flow rate of the fluid flowing through the internal flow path 1a on the basis of the measured pressure values by the pressure sensors 2A, 2B and the resistance value of the resistive flow path 3.

As illustrated in FIG. 2, the fluid control valve 20 is one that includes a valve seat 21, a valve body 22, and a stacked piezoelectric element 23, and is configured to control the flow rate or the like of the fluid by applying drive voltage to the stacked piezoelectric element 23 to extend/contract the stacked piezoelectric element 23 and thereby displacing the valve body 22 with respect to the valve seat 21. The valve body 22 is one that is displaced along with the extension/contraction of the stacked piezoelectric element 23 and here has at least a diaphragm.

Note that the fluid control valve 20 may be one of a normally closed type or of a normally opened type.

The control circuit 30 illustrated in FIG. 1 consists of a circuit board mounted with a CPU, a memory, an I/O channel, an A/D converter, a D/A converter, and other analog and digital electric circuits, and by making the CPU and other peripheral devices cooperate in accordance with a program stored in the memory, controls the fluid control valve 20 to perform control so that the fluid flow rate through the internal flow path 1a becomes equal to an externally indicated set flow rate.

To describe more specifically, the control circuit 30 includes functions as at least a flow rate calculation part 31 and a valve control part 32, and here further includes a function as a fully opening/fully closing signal reception part 33 adapted to a fully opening signal and a fully closing signal externally inputted in order to forcibly fully open or fully close the fluid control valve 20.

Upon receipt of output signal values from the respective pressure sensors 2A, 2B, the flow rate calculation part 31 calculates the pressures of the fluid on the upstream side and the downstream side of the resistive flow path 3 from the output signal values on the basis of a predetermined conversion expression taking account of an offset, a coefficient, and the like, and calculates the flow rate of the fluid flowing through the resistive flow path 3 on the basis of the pressures, a preliminarily measured fluid resistance value (resistance coefficient) of the resistive flow path 3, fluid viscosity, and the like.

Then, when the set flow rate is provided by an operator or from another external device, the valve control part 32 calculates the deviation between the set flow rate and the calculated flow rate, and controls the flow rate of the fluid flowing through the internal flow path 1a by, on the basis of the deviation, controls the drive voltage applied to the stacked piezoelectric element 23 to displace the valve body 22 so that the calculated flow rate comes close to the set flow rate.

In addition, the fluid control device 100 of the present embodiment further includes the fluid control valve diagnostic device 40 (hereinafter referred to as a diagnostic device 40).

Figure 3:
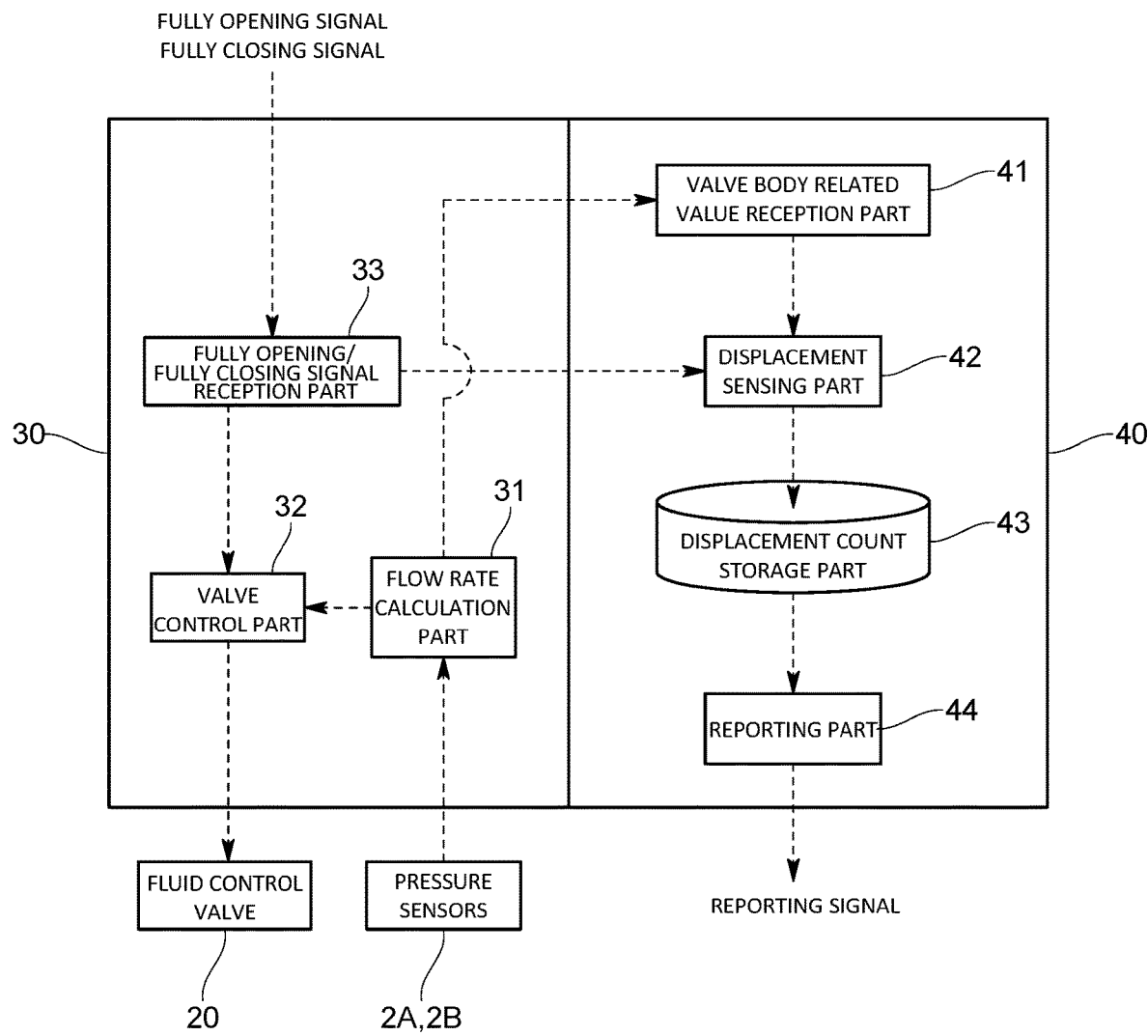
FIG. 3 is a functional block diagram illustrating functions of a diagnostic device of the same embodiment.

The diagnostic device 40 may be one including, separately from the above-described control circuit 30, a circuit board mounted with a CPU, a memory, and other analog and digital electric circuits; however, here, part of the circuit board constituting the control circuit 30 is also used for the diagnostic device 40. The diagnostic device 40 is one that, as illustrated in FIG. 3, functionally includes a valve body related value reception part 41, a displacement sensing part 42, a displacement count storage part 43, and a reporting part 44 by making a CPU and other peripheral devices cooperate in accordance with a program stored in the memory.

The valve body related value reception part 41 receives a valve body related value inputted/outputted in association with the displacement of the valve body 22.

The valve body related value is a value whose variation displaces the valve body 22 or a value that is varied by displacing the valve body 22, and a value that is varied by a change in fluid control content. Examples of the former include the externally inputted set flow rate, the drive voltage inputted to the stacked piezoelectric element 23 in order to displace the valve body 22, and the like. On the other hand, examples of the latter include a current or a voltage outputted from a position sensor for detecting a position of the valve body 22, the calculated flow rate calculated by the control circuit 30, and the like.

The valve body related value reception part 41 in the present embodiment is configured to receive at least the above-described calculated flow rate from the flow rate calculation part 31.

The displacement sensing part 42 senses the displacement of the valve body on the basis of the valve body related value received by the valve body related value reception part 41.

Specifically, the displacement sensing part 42 is one that, when the valve body 22 is displaced enough to result in deterioration, counts the displacement as a displacement count of one, and configured to, for example, when the valve body 22 is slightly displaced due to the effect of noise or the like, not count this as a displacement count.

Figure 4:
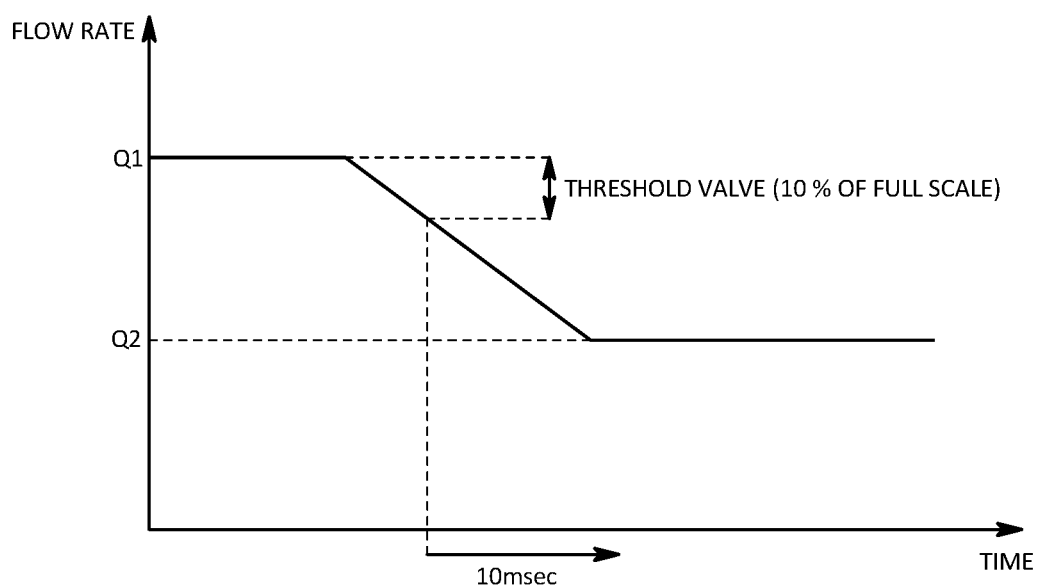
FIG. 4 is a diagram for explaining the operation of the diagnostic device of the same embodiment.

As illustrated in FIG. 4, the displacement sensing part 42 here senses displacement on the basis of a temporal change in the calculated flow rate received by the valve body related value reception part 41, and counts the resulting displacement count. In more detail, when a variation in the calculated flow rate exceeds a threshold value, this is counted as a displacement count of one.

To describe more specifically, for example, when the set flow rate is changed from Q1 to Q2, along with the change, the calculated flow rate varies from Q1 toward Q2. When a state where a variation in the calculated flow rate from Q1 exceeds a constant flow rate (e.g., a 10% flow rate of the full scale) set as the threshold value continues for a constant time (e.g., 10 msec.), this is counted as a displacement count of one. Note that the set values of the constant flow rate and the constant time may be appropriately changed.

Further, in the present embodiment, when the fluid control valve 20 is forcibly fully opened or fully closed, the valve body 22 is highly likely to be largely displaced, and therefore the displacement sensing part 42 counts the number of reception times of the fully opening signal and fully closing signal received by the fully opening/fully closing signal reception part 33, in other words, the number of input times of the externally inputted fully opening signal and fully closing signal, as a displacement count of one.

The displacement count storage part 43 is one that is formed in a predetermined area of the memory and stores the displacement count counted by the displacement sensing part 42, and here adapted to integrate and store the displacement count in the displacement count storage part 43 every time a predetermined time (e.g., one hour) elapses. In addition, the displacement count storage part 43 may be formed in an external memory such as an SD card.

When the displacement count integrated and stored in the displacement count storage part 43 exceeds a predetermined warning count, the reporting part 44 outputs a reporting signal indicating this.

As a specific embodiment of the reporting part 44, various ones are conceivable, such as emitting sound, light, or the like, or outputting a warning indication on a display incidental to or connected to the diagnostic device 40 when the displacement count exceeds the predetermined warning count.

In addition, the warning count is the preset count, but may be set to a certain count or to multiple counts stepwise. The latter case may be adapted such that, for example, a first warning count indicates that maintenance time due to the deterioration of the fluid control valve is near, and a second warning count indicates that maintenance due to the deterioration of the fluid control valve is necessary.

In the fluid control device 100 according to the present embodiment configured as described above, since the diagnostic device 40 senses the displacement of the valve body 22 to count the resulting displacement count, as well as stores the displacement count, information on the movement of the fluid control valve 20 can be obtained, and what effect is exerted on the operation of the fluid control device by deterioration associated with the movement of the fluid control valve 20 can be evaluated.

Also, since when the displacement count stored in the displacement count storage part 43 exceeds the predetermined warning count, the reporting part 44 reports this, a user can be prompted to maintain or replace the fluid control device 100 before a problem occurs in the fluid control device 100 due to the deterioration associated with the movement of the fluid control valve 20.

Note that the present invention is not limited to the above-described embodiment.

For example, the displacement sensing part in the above-described embodiment senses the displacement of the valve body when a variation in the calculated flow rate exceeds the threshold value, but when a variation in the drive voltage inputted to the stacked piezoelectric element, a variation in the current or voltage outputted corresponding to the position of the valve body, or a variation in the set flow rate exceeds a threshold value, may sense this as the displacement of the valve body.

In this case, the displacement count storage part may integrate and store all the above-described displacement counts or integrate and store a displacement count in each case.

Also, the diagnostic device in the above-described embodiment includes the function as the reporting part, but does not necessarily have to include the reporting part.

Even in such a case, the effect of the deterioration associated with the movement of the fluid control valve can be evaluated by checking the displacement count stored in the displacement count storage part.

In addition, in the above-described embodiment, the diagnostic device is provided to the fluid control device; however, the diagnostic device may be a separate body from the fluid control device. Specifically, a vapor phase growth apparatus such as an MOCVD including: multiple fluid control devices for controlling material gas, carrier gas, and the like; and the diagnostic device according to the present invention provided separately from these fluid control devices, in which the diagnostic device is configured to obtain information on the movement of a fluid control valve of each of the fluid control devices can be cited.

In such a configuration, the diagnostic device obtains pieces of information on the movements of the fluid control valves of the multiple fluid control devices, and therefore the vapor phase growth apparatus can centrally control the multiple fluid control devices.

Further, the flow rate measuring mechanism in the above-described embodiment is one of a differential pressure type, but may be one of a thermal type, a Coriolis type, or an ultrasonic type.

Besides, it goes without saying that the present invention is not limited to the above-described embodiment, but can be variously modified without departing from the scope thereof.

INDUSTRIAL APPLICABILITY

As described above, according to the present invention, information on the movement of the fluid control valve of the fluid control device can be obtained, and by evaluating the effect of the deterioration associated with the movement of the fluid control valve, a user can be prompted to perform maintenance before a problem occurs in the fluid control device.

The invention claimed is:

1. A fluid control device comprising:
    a fluid control valve that displaces a valve body to control fluid;
    a flow rate measuring mechanism configured to measure a flow rate of the fluid;
    a control circuit configured to control the fluid control valve on a basis of the measured flow rate; and
    a fluid control valve diagnostic device for the fluid control valve, the fluid control valve diagnostic device comprising:
        a valve body related value receiver that receives a valve body related value inputted/outputted in association with displacement of the valve body;
        a displacement sensor that senses the displacement of the valve body on a basis of the valve body related value; and
        memory that stores a displacement count sensed by the displacement sensor, wherein
    when the fluid control valve moves to a fully opened position, the displacement sensor senses displacement of the valve body and adds one to the displacement count,
    when the fluid control valve moves to a fully closed position, the displacement sensor senses displacement of the valve body and adds one to the displacement count, and
    part of a circuit board of the control circuit and part of a circuit board of the fluid control valve diagnostic device are shared.

2. The fluid control valve diagnostic device according to claim 1, wherein
    when a variation in the valve body related value exceeds a predetermined threshold value, the displacement sensor senses this as the displacement of the valve body.

3. The fluid control valve diagnostic device according to claim 1, further comprising:
    a displacement count indicator that compares the displacement count stored by the memory with a predetermined count, and when the displacement count exceeds the predetermined count, outputs a reporting signal indicating this.

4. The fluid control valve diagnostic device according to claim 1, wherein
    the valve body related value is a calculated flow rate of the fluid, a set flow rate of the fluid, a drive voltage for displacing the valve body, or a current or a voltage outputted corresponding to a position of the valve body.

5. A fluid control device comprising:
    a fluid control valve that displaces a valve body to control fluid;
    a flow rate measuring mechanism configured to measure a flow rate of the fluid;
    a control circuit configured to control the fluid control valve on a basis of the measured flow rate; and
    a fluid control valve diagnostic storage medium storing a program,
    the program being executable by the control circuit to diagnose the fluid control valve and instruct a computer to fulfil functions of a fluid control diagnostic device comprising:
        a valve body related value receiver that receives a valve body related value inputted/outputted in association with displacement of the valve body;
        a displacement sensor that senses the displacement of the valve body on a basis of the valve body related value; and
        memory that stores a displacement count sense by the displacement sensor, wherein
    when the fluid control valve moves to a fully opened position, the displacement sensor senses displacement of the valve body and adds one to the displacement count,
    when the fluid control valve moves to a fully closed position, the displacement sensor senses displacement of the valve body and adds one to the displacement count, and
    part of a circuit board of the control circuit and part of a circuit board of the fluid control valve diagnostic device are shared.

6. A fluid control device comprising:
    a fluid control valve that displaces a valve body to control fluid;
    a flow rate measuring mechanism configured to measure a flow rate of the fluid;
    a control circuit configured to control the fluid control valve on a basis of the measured flow rate; and
    a fluid control valve diagnostic device for the fluid control valve, the fluid control valve diagnostic device comprising:
        a valve body related value receiver that receives a valve body related value inputted/outputted in association with displacement of the valve body;
        a displacement sensor that senses the displacement of the valve body on a basis of the valve body related value;
        a fully opening/fully closing signal receiver that receives a fully opening signal externally inputted in order to forcibly fully open the fluid control valve and a fully closing signal externally inputted in order to forcibly fully close the fluid control valve; and
        memory that stores a displacement count sensed by the displacement sensor, wherein
    when the fully opening/fully closing signal receiver receives the fully opening signal, the displacement sensor senses displacement of the valve body and adds one to the displacement count,
    when the fully opening/fully closing signal receiver receives the fully closing signal, the displacement sensor senses displacement of the valve body and adds one to the displacement count, and
    part of a circuit board of the control circuit and part of a circuit board of the fluid control valve diagnostic device are shared.

* * * * *